United States Patent [19]

Sirovy

[11] 4,453,670
[45] Jun. 12, 1984

[54] PLURAL COMPONENT FLUSHLESS SPRAY GUN

[75] Inventor: Robert L. Sirovy, Glen Ellyn, Ill.

[73] Assignee: Binks Manufacturing Company, Franklin Park, Ill.

[21] Appl. No.: 417,095

[22] Filed: Sep. 13, 1982

[51] Int. Cl.³ .............................................. B05B 7/04
[52] U.S. Cl. .................................... 239/117; 239/432
[58] Field of Search ........................ 239/432, 112–118, 239/526, 527, 528

[56] References Cited

U.S. PATENT DOCUMENTS 3,366,337 1/1968 Brook et al. ......................... 239/414
4,133,483 1/1979 Henderson ....................... 259/527 X Primary Examiner—Jeffrey V. Nase
Assistant Examiner—Kevin Weldon
Attorney, Agent, or Firm—Gary, Juettner & Pyle

[57] ABSTRACT

A plural component flushless spray gun has a fluid outlet orifice defined by two opposed inlet orifices with a thin blade interposed therebetween. The blade prevents fluidic material exiting each inlet orifice from flowing directly into the other, and is slotted at its forward end to define a very small volume chamber into which the components flow for mixing prior to being emitted through the outlet orifice defined at the forward end of the slot. Because the chamber has a very small volume, the components are intimately mixed for better polymerization, and only a very small quantity of reactive components are mixed within the gun immediately behind the outlet orifice. Consequently, should the mixed components harden within the gun, only a limited amount of material is involved and the blockage may readily be removed simply by triggering the gun on to eject the blockage through the outlet orifice.

22 Claims, 16 Drawing Figures

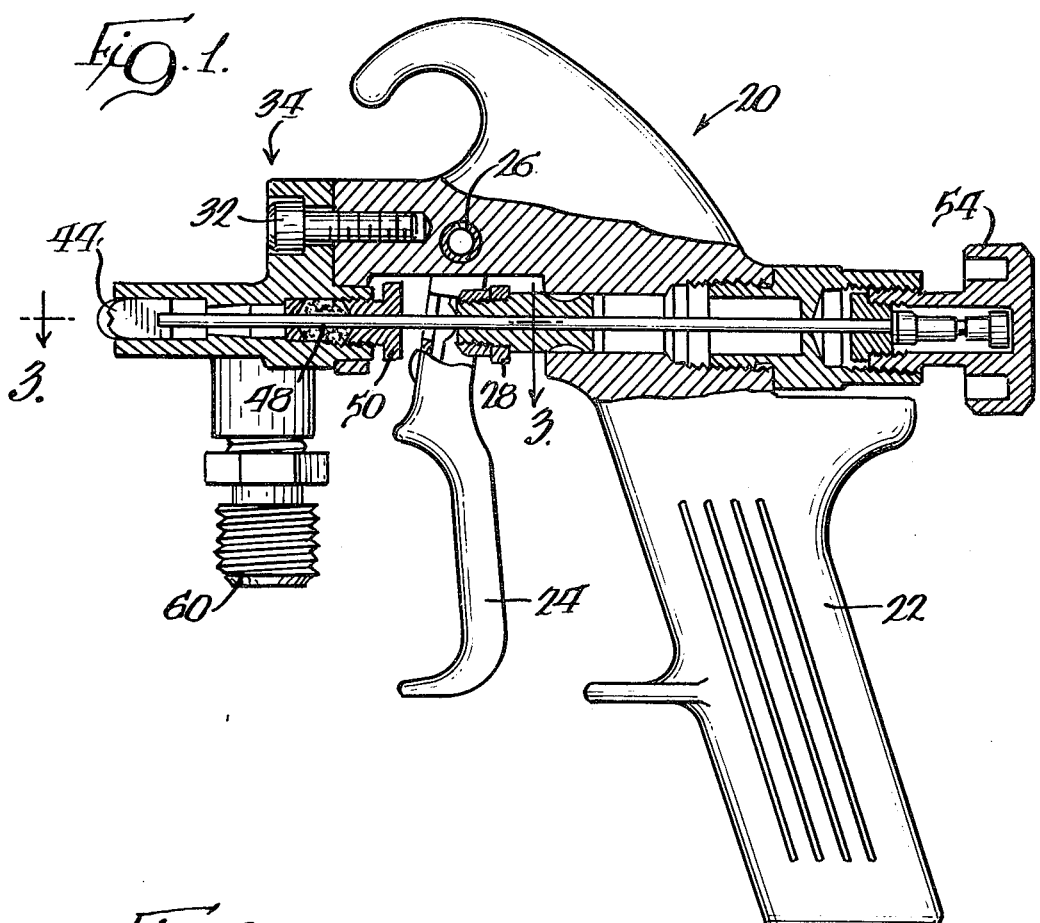
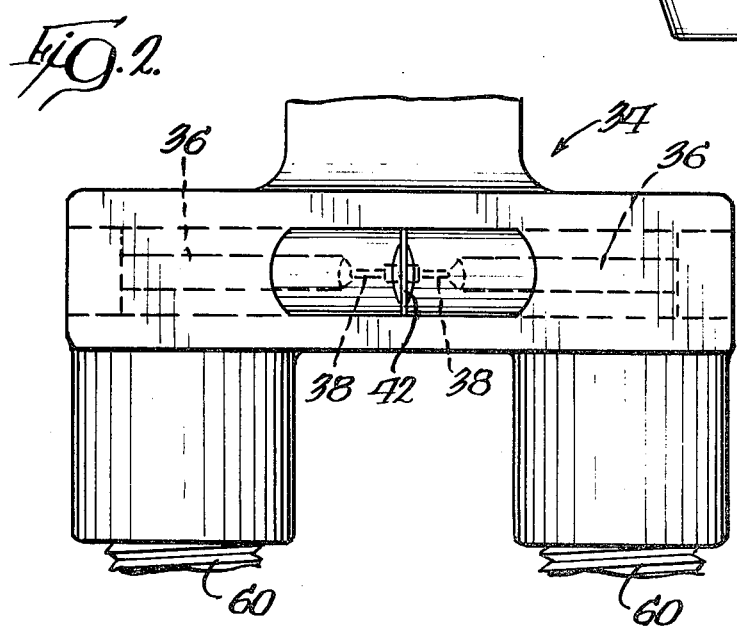

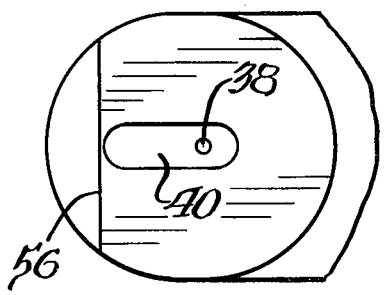
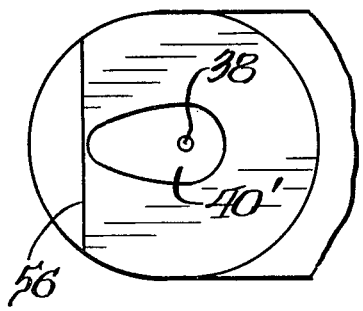
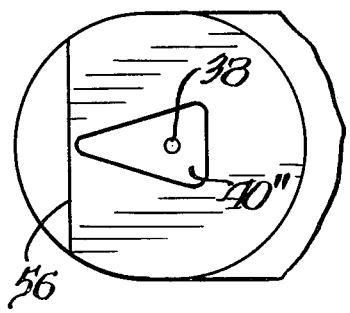
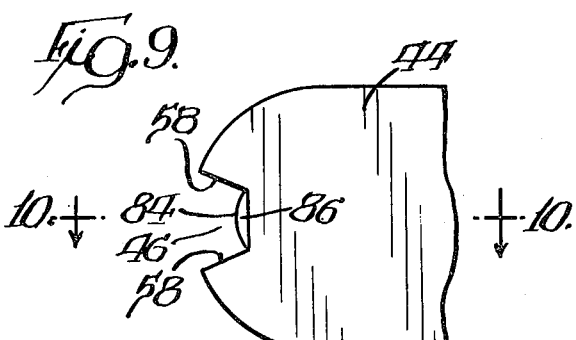
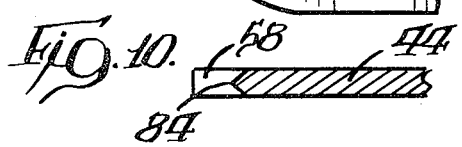
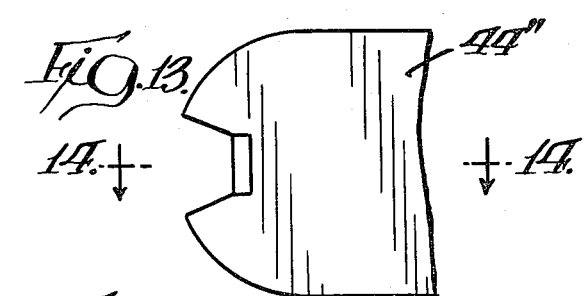
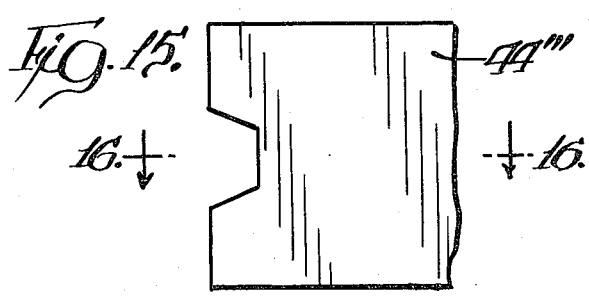

PLURAL COMPONENT FLUSHLESS SPRAY GUN

BACKGROUND OF THE INVENTION

The present invention relates to improvements in spray guns, and in particular to an airless spray gun for spraying two component chemically reactive resin forming materials, especially those which are foam forming.

One exemplary type of spray gun for plural component materials, especially those that are foam forming, is disclosed in U.S. Pat. No. 3,366,337 to Brooks et al, assigned to the assignee of the present invention. In that spray gun, means are provided for intimately mixing and spraying a pair of coreactive chemical fluids immediately prior to the situs of application, by impinging jets or streams of the reactants against each other under pressure from opposed directions into the rearward end of a relatively large mixing chamber, whereby the reactants are mixed within the chamber and discharged therefrom through an outlet orifice at a forward end thereof solely under the influence of the pressure. Mixing and spraying is accomplished without the aid of or necessity for a mechanical agitating or mixing means which might hamper or impede the flow or the resultant reaction mixture, and as a result a better foamed product is produced.

At the end of a spraying operation, mixed materials within the chamber must be quickly removed before completion of the reaction and formation of a blockage of foam in the gun. To that end, in the spray gun of said U.S. Pat. No. 3,366,337, means are provided for separately introducing a stream of solvent into the rearward end of the mixing chamber after the gun has been operated, so that the chamber and outlet orifice can be cleaned of residual material to enable further spraying operations. Disadvantages of the cleaning technique are that a separate container must be provided to collect the discharge during cleaning, it occasionally happens that the solvent contacts and mars a finished foamed product, the use of solvent adds cost to the foaming operation, and in view of environmental considerations it is not desirable that solvent be sprayed into the air. In addition, cleaning of the chamber with solvent is often less than thorough, with the result that the gun must be disassembled to remove hardened material, and customary practice contemplates soaking the gun in solvent to remove mixed reactants whenever the gun is not going to be used for a period of time.

OBJECTS OF THE INVENTION

An object of the present invention is to provide an improved plural component spray gun for spraying foam forming materials, which does not need to be flushed clean of coreactive materials between spraying operations.

Another object is to provide a plural component spray gun wherein mixing of components occurs in a very small volume chamber immediately behind an outlet orifice from the gun, so that only a small quantity of mixed reactants is ever present in the gun, and wherein any blockage resulting from reaction components may readily be removed simply by triggering the gun on and ejecting the blockage through the orifice.

A further object is to provide such a spray gun, wherein the delivery rate of material from the gun may be controlled at the gun itself without need to vary the pressure at which the components are supplied to the gun.

Yet another object is to provide a considerably simplified structure of plural component spray gun, wherein the outlet orifice from the gun is formed by two opposed inlet orifices with a slotted plate or blade interposed therebetween.

SUMMARY OF THE INVENTION

In accordance with the present invention, there is provided an airless plural component spray gun comprising a gun body; a fluid outlet at a forward end of said body; a pair of opposed channels in said body extending rearwardly from said outlet, and a relatively thin blade interposed between and substantially sealed with said channels whereat it overlies the same. A forward edge of said blade extends across said channels rearwardly of said outlet, and means are included for introducing first and second fluidic components under pressure into respective ones of said channels rearwardly of said forward blade edge for flow through said channels into a very small volume mixing chamber defined between said forward blade edge and said outlet and thence through said outlet, said components being intimately contacted and mixed together in said chamber.

The foregoing and other objects, advantages and features of the invention will become apparent upon a consideration of the following detailed description, when taken in conjunction with the accompanying drawings.

BRIEF DESCRIPTON OF THE DRAWINGS

FIG. 1 is a side elevation view, partly in cross-section, illustrating a spray gun configured in accordance with the teachings of the present invention;

FIG. 2 is a partial front elevation view of the spray gun, showing the outlet orifice from the gun;

FIG. 3 is a cross-sectional top plan view taken substantially along the lines 3—3 of FIG. 1, and illustrates a forward head or valve portion of the spray gun;

FIG. 4 is a cross-sectional side elevation view taken substantially along the lines 4—4 of FIG. 3, and illustrates the positional relationship of an outlet orifice forming blade with respect to an inlet orifice to the gun;

FIG. 5 is a cross sectional top plan view taken substantially along the lines 5—5 of FIG. 4, and shows the blade interposed between two inlet orifices to the gun;

FIG. 6 is taken substantially along the lines 6—6 of FIG. 5, and illustrates one configuration of an inlet orifice to the gun;

FIGS. 7 and 8 are similar to FIG. 6, and illustrate other configurations of inlet orifices, and FIGS. 9-16 show various possible configurations of the forward end of the blade that is interposed between the inlet orifices.

DETAILED DESCRIPTION

Referring to the drawings, the reference numeral 20 indicates a generally conventional spray gun body having a handle 22 and a trigger 24 pivoted at 26 on the body, the trigger extending from a yoke 28 adapted to jointly actuate a pair of spring pressed valve rods 30—30. Secured to the body by a bolt 32 is a head portion, indicated generally at 34. The head portion is provided with a pair of angulated ducts 36—36, which terminate in reduced diameter inlet orifices 38—38. The orifices open into rearward portions of respective elongate slots or channels 40—40 formed at the forward end of the head portion immediately behind a fluid outlet orifice 42.

Extending between, sealed with whereat it overlies and generally separating the slots 40—40 is a thin flat blade or plate 44 having a generally trapezoidal shaped opening 46 in its forward end. The blade is connected to a control rod 48 which extends rearwardly through a gland 50 in the head and a fitting 52 on the yoke 28 to an adjustment knob 54 at a rearward end of the spray gun. The adjustment knob is rotatable to move the control rod in either direction longitudinally along its length, thereby to position the blade at a selected longitudinal position along and over the slots. The slots terminate immediately behind sharp edges 56—56 extending along and on opposite sides of the outlet orifice 42, whereby with the blade adjusted to move side edges 58—58 of the opening 46 therein to at least the sharp edges 56—56, the sharp edges and the blade side edges together define the fluid outlet orifice.

Liquid chemical reactant components are supplied from sources thereof (not shown) to the inlet orifices 38—38 under a constant uniform pressure of, for example, from about 800 to about 2600 pounds per square inch by means of suitable pumps (not shown), such as conventional high pressure piston pumps driven by air or electric motors. The amount of reactants or their proportions can be varied by varying the stroke and thus the output from the pumps, or in the alternative different sized pumps can be employed. Conduits or supply lines (not shown) for the materials lead from the pumps to respective inlets 60—60 in the head portion 34.

Figures 3, 4, 5:
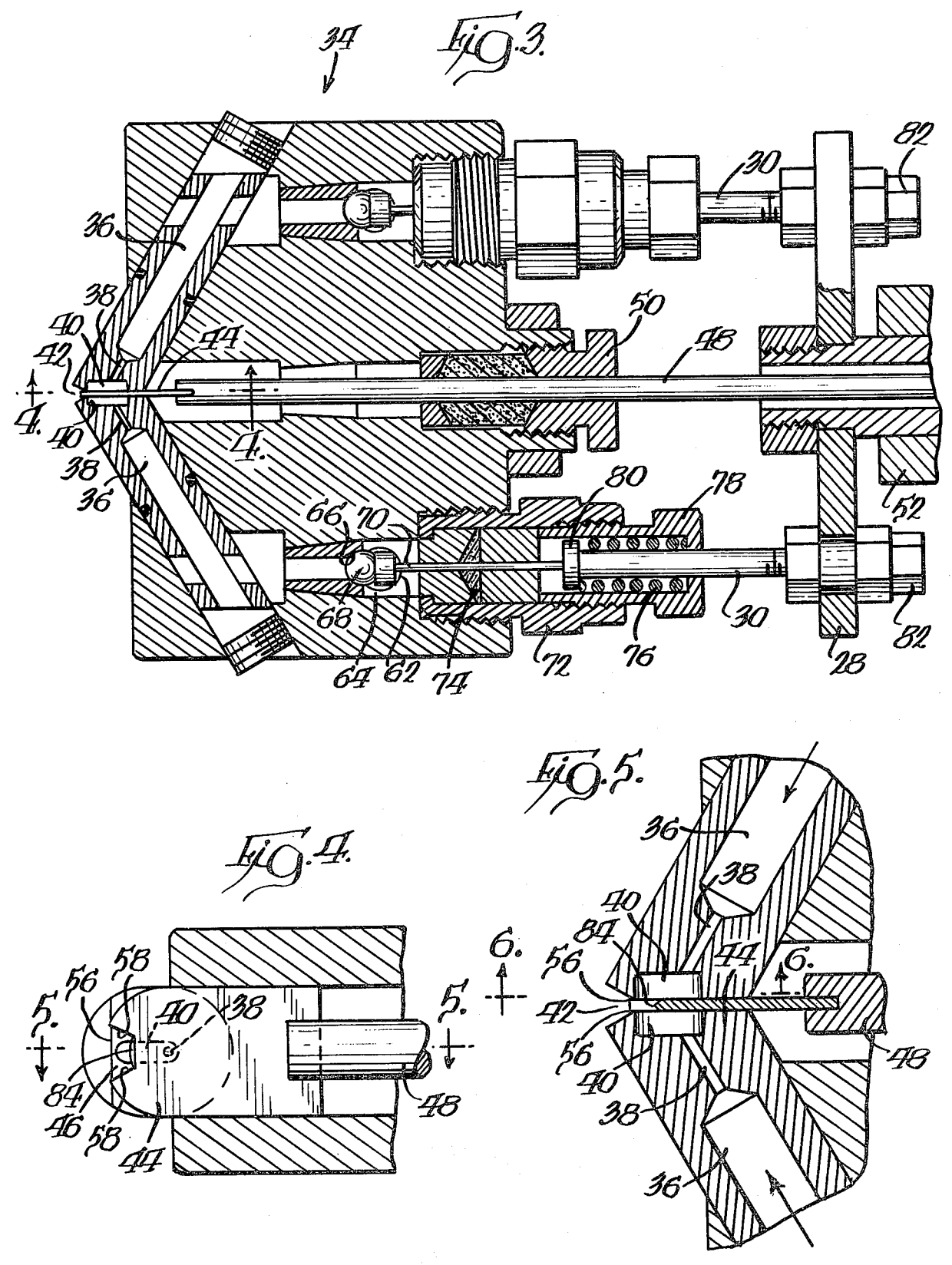

The valving of each component from the respective inlet 60—60 to the respective duct 36—36 is accomplished through two identical valve arrangements, and therefore only one will be described. With reference to FIG. 3, from one inlet 60 a liquid component passes through an inlet 62 into a chamber 64 provided with a valve seat 66 seating a valve ball 68 carried on a stem 70 of the rod 30. The stem is engaged in a retainer 72 and a packing 74 and is pressed by means of a spring 76 disposed in a gland 78 acting against a flange component 80. The rear or outer free ends of the rods 30—30 each pass through the yoke 28 whereat they are engaged by fasteners 82—82, whereby upon actuating the trigger 24 both valve balls are jointly withdrawn to permit liquid from the respective supplies to flow under pressure through the ducts 36—36 and the orifices 38—38 into the slots 40—40.

In practice of the invention, the adjustment knob 54 is rotated to position a bottom edge 84 of the opening 46 in the blade 44 forwardly of the points whereat the orifices 38—38 open into the slots 40—40, so that fluid exiting each orifice cannot be impinged directly against the other. Instead, as the fluids enter the slots they flow separately and out of contact with each other toward the outlet orifice 42 through channels defined by the slots and the blade, until the fluids flow past the inner edge 84 of the blade opening. At this point, the fluids come together within a relatively small volume mixing chamber defined within the blade opening rearwardly of the sharp edges 56 of the outlet orifice. Consequently, depending upon the longitudinal position of the blade, mixing occurs within a very small area either within or immediately adjacent to the outlet orifice. Because of the very small size of the mixing chamber the materials are intimately contacted and thoroughly mixed, and it has been found that materials polymerized in such a close physical proximity are considerably more uniform than would otherwise be obtainable with a conventional, relatively large volume mixing chamber. After being intimately mixed, the materials then flow through the outlet orifice and are atomized in a spray.

In addition, because mixing occurs either in or immediately adjacent to the outlet orifice, and since the materials angularly flow into the mixing chamber, as compared with being impinged directly against one another, a more uniform distribution of material within the resulting spray is obtained. In that connection, the angle of divergence of the resulting fan-shaped spray is determined by and is the same as the angle of divergence of the side edges 58—58 of the blade opening 46, while the longitudinal position of the blade, which determines the length of the outlet orifice 42 and the size of the mixing chamber, controls the density or volumetric flow rate of spray material.

FIG. 6 is an enlarged view of the slot 40, and FIGS. 9 and 10 illustrate the blade 44, as the same are configured in FIGS. 1-5. As is seen, the inner end 84 of the blade opening 46 is defined at the end of a projection 86, the projection directing material flowing through the slots smoothly and angularly into the mixing chamber to provide efficient and uniform mixing of the material and an even spray. It is contemplated, however, that the slot and the blade may have other configurations, and FIGS. 7 and 8 show two additional configurations for slots 40' and 40" and FIGS. 11-16 show three additional configurations for blades 44', 44" and 44'".

In addition to very uniform mixing and polymerizing of materials and convenient control over the angle of divergence of the fan-shaped spray and the volume flow of spray material, a very significant advantage of the spray gun is that it is flushless. Unlike other plural component spray guns for dispensing coreactive materials, the spray gun of the invention need not be purged either chemically or mechanically between spraying operations, or even at the end of a spraying operation when the gun will not again be used for a considerable period of time. That purging is not required may be appreciated if it is considered that, except for within the very small volume mixing chamber defined within the opening 46 of the blade 44 rearwardly of the edges 56—56 of the outlet orifice 42, the reactive components are maintained completely separate. Only within the mixing chamber are the components brought together, but since the chamber is extremely small, only a very small quantity of the components can ever react and harden within the gun. Should the components harden within the mixing chamber, because the outlet orifice forms the forward side of the chamber, and the chamber decreases in cross-sectional area rearwardly of the orifice, the blockage may be removed simply by triggering the gun on and forceably ejecting the plug of material from the gun through the outlet orifice. In the alternative, the blade could be moved forward by means of the adjustment knob 54 to push or shove the blockage from the gun through the orifice.

It may also be appreciated that while the gun has been described as being adapted to spray coreactive components, it may also be used to mix and pour such components merely by decreasing the pressure at which the materials are supplied to the point whereat hydraulic atomization does not occur from the outlet orifice when the gun is triggered on. Further, the gun could be used to spray a single component simply by replacing one of the inlet orifices 38 and its slot 40 with a flat surface.

While embodiments of the invention have been described in detail, various modifications and other embodiments thereof may be devised by one skilled in the art without departing from the spirit and scope of the invention, as defined in the appended claims.

What is claimed is:

1. An airless plural component spray gun, comprising a gun body; a fluid outlet at a forward end of said body; a pair of opposed channels in said body extending rearwardly from said outlet; a relatively thin blade interposed between and substantially sealed with said channels whereat it overlies the same, a forward edge of said blade extending across said channels rearwardly of said outlet; and means for introducing first and second fluidic components under pressure into respective ones of said channels rearwardly of said forward blade edge for flow through said channels into a very small volume mixing chamber defined between said forward blade edge and said outlet and thence through said outlet, said components being intimately contacted and mixed together in said chamber.

2. A spray gun as in claim 1, including means for adjustably moving said blade toward and away from said fluid outlet to vary the size of said mixing chamber and the flow rate of the components through said fluid outlet.

3. A spray gun as in claim 1, wherein said blade has a cut away area at a forward end thereof which opens upon the front of said blade, said cut away area being centered with respect to said channels and having an inner edge which defines said blade forward edge and side edges which extend forwardly of said inner edge to at least said fluid outlet, and said mixing chamber is defined within said cut away area rearwardly of said fluid outlet.

4. A spray gun as in claim 3, wherein said fluid outlet is elongate and has a width substantially equal to the thickness of said blade, and said body has a pair of relatively sharp edges on opposite sides of and along the length of said outlet, said relatively sharp edges, said cut away area side edges thereat and said outlet therebetween defining an airless outlet orifice from said gun for atomization of the mixed components into a fan-shaped spray.

5. A spray gun as in claim 4, wherein said cut away area is generally trapezoidal-shaped, side edges thereof diverge from said inner edge thereof and the angle of divergence of said side edges determines the angle of divergence of the fan-shaped spray.

6. A spray gun as in claim 4, wherein the components flow into said mixing chamber at an angle and are not impinged diametrically against each other for improved mixing of the components and uniformity of spray issuing from said orifice.

7. An airless plural component spray gun, comprising a gun body; an elongate fluid outlet at a forward end of said body; a pair of opposed channels in said body extending rearwardly from said outlet; a relatively thin blade interposed between and substantially sealed with said channels whereat it overlies the same, said blade having a cut away area at a forward end thereof which opens upon the front of said blade and is centered with respect to said channels, said cut away area having a rear edge and side edges extending forwardly therefrom; means for introducing first and second fluidic materials under pressure into respective ones of said channels toward the rearward ends thereof; and means for controlling the position of said blade so that said rear edge extends across said channels intermediate said points of introduction of materials therein and said fluid outlet and so that said side edges extend forwardly to at least said fluid outlet, said fluid outlet having a width substantially equal to the thickness of said blade so that said side edges and said fluid outlet therebetween form an outlet orifice from said gun, whereby upon introduction of materials into said channels the materials flow forwardly through said channels into a very small volume mixing chamber defined within said cut away area rearwardly of said outlet orifice for being intimately mixed therein, and thence flow through said outlet orifice for being emitted from said gun in a spray.

8. A spray gun as in claim 7, wherein said means for controlling the position of said blade comprises means for adjustably moving said blade toward and away from said outlet orifice and across said channels to vary the size of said mixing chamber and the flow rate of the materials through said outlet orifice.

9. A spray gun as in claim 8, wherein said means for adjustably moving said blade is operable to move said rear edge forwardly into said fluid outlet to clear a blockage from said mixing chamber by forcing said blockage through said outlet and out of said gun.

10. A spray gun as in claim 7, wherein said cut away area is generally trapezoidal-shaped, said side edges diverge outwardly from said rear edge and the angle of divergence of said side edges determines the angle of divergence of said spray.

11. A spray gun as in claim 7, wherein said cut away area is generally trapezoidal-shaped and said side edges diverge outwardly from said rear edge.

12. A spray gun as in claim 11, wherein said rear edge is slightly curved and beveled to opposite sides to define a relatively sharp edge extending between said side edges.

13. A spray gun as in claim 11, wherein said rear edge is straight and beveled to opposite sides to define a relativey sharp edge extending between said side edges.

14. A spray gun as in claim 11, wherein said rear edge is straight and beveled to one side to define a relatively sharp edge extending between said side edges.

15. A spray gun as in claim 11, wherein said rear edge is straight.

16. A spray gun as in claim 7, wherein said channels are elongate and have parallel side edges and semi-circular ends.

17. A spray gun as in claim 7, wherein said channels are tear drop-shaped and the narrow ends thereof are toward said fluid orifice.

18. A spray gun as in claim 7, wherein said channels are triangular-shaped and apexes thereof are toward said fluid orifice.

19. A spray gun as in claim 7, wherein said fluidic materials are introduced into said channels under a pressure sufficient to force a blockage from said mixing chamber through said outlet orifice and out of said gun.

20. An airless spray gun, comprising a gun body; a fluid outlet at a forward end of said body; a channel in said body extending rearwardly from said outlet; a relatively thin blade overlying said channel and substantially sealed with said channel whereat it overlies the same, a forward edge of said blade extending across said channel rearwardly of said outlet; and means for introducing a fluidic component under pressure into said channel rearwardly of said forward blade edge for flow through said channel into a chamber defined between said forward blade edge and said outlet and thence through said outlet.

21. A spray gun as in claim 20, wherein said blade has a cut away area at a forward end thereof which opens upon the front of said blade, said cut away area being centered with respect to said channel and having a rear edge which defines said forward edge of said blade and side edges which extend forwardly of said rear edge, said blade being positioned so that said side edges extend to at least said fluid outlet and define with the portion of said outlet therebetween a spray orifice from said gun, said cut away area rearwardly of said orifice defining said chamber.

22. A spray gun as in claim 21, wherein said cut away area is generally trapezoidal-shaped and said side edges diverge outwardy from said rear edge, and including means for adjustably moving said blade toward and away from said outlet orifice to vary the size of said orifice and chamber and thereby the flow rate of the component through said orifice.

* * * * *